US012760244B2

United States Patent
(12) United States Patent
McIntire et al.

(10) Patent No.: US 12,760,244 B2
(45) Date of Patent: Oct. 13, 2026

(54) CLEANING COMPOSITIONS COMPRISING SURFACE MODIFICATION POLYMERS

(71) Applicant: ECOLAB USA INC., Saint Paul, MN (US)

(72) Inventors: Eileen McIntire, Saint Paul, MN (US); Peter Reed, Saint Paul, MN (US); David Riehm, Saint Paul, MN (US); Jennifer Stokes, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 231 days.

(21) Appl. No.: 18/760,294

(22) Filed: Jul. 1, 2024

(65) Prior Publication Data

US 2025/0011685 A1 Jan. 9, 2025

Related U.S. Application Data

(60) Provisional application No. 63/511,506, filed on Jun. 30, 2023.

(51) Int. Cl.
*C11D 1/00* (2006.01)
*C11D 1/58* (2006.01)
(Continued)

(52) U.S. Cl.
CPC ................ *C11D 1/94* (2013.01); *C11D 1/008* (2013.01); *C11D 1/58* (2013.01); *C11D 1/662* (2013.01);
(Continued)

(58) Field of Classification Search
CPC .. C11D 1/94; C11D 1/008; C11D 1/58; C11D 1/662; C11D 1/835; C11D 1/90;
(Continued)

(56) References Cited

U.S. PATENT DOCUMENTS 6,767,410 B2 7/2004 Aubay et al.
8,021,650 B2 9/2011 Tamareselvy et al.
(Continued)

FOREIGN PATENT DOCUMENTS

CN 101818103 A * 9/2010 ............... C11D 1/94
CN 101818104 B 9/2011
(Continued)

OTHER PUBLICATIONS

Bujak T, Niziol-Łukaszewska Z, Ziemlewska A. Amphiphilic cationic polymers as effective substances improving the safety of use of body wash gels. International journal of biological macromolecules. Mar. 15, 2020; 147:973-9.
(Continued)

*Primary Examiner* — Eisa B Elhilo
(74) *Attorney, Agent, or Firm* — McKee, Voorhees & Sease, PLC

(57) ABSTRACT

The invention relates to neutral cleaning compositions comprising a surface modification polymer to beneficially aid in removing typical bathroom soils, such as hard water deposits, at a neutral pH. The neutral cleaning compositions effectively remove and/or otherwise assist in general cleaning of difficult bathroom soils without the harsh effects of a traditional acidic cleaning composition and without requiring PPE. Additionally, use of the cleaning composition beneficially aids in and/or improves subsequent cleanings.

19 Claims, 8 Drawing Sheets

(51) Int. Cl.

| | |
|---|---|
| ***C11D 1/66*** | (2006.01) |
| ***C11D 1/835*** | (2006.01) |
| ***C11D 1/90*** | (2006.01) |
| ***C11D 1/94*** | (2006.01) |
| ***C11D 3/00*** | (2006.01) |
| ***C11D 3/20*** | (2006.01) |
| ***C11D 17/00*** | (2006.01) |

(52) U.S. Cl.
CPC ................ *C11D 1/835* (2013.01); *C11D 1/90* (2013.01); *C11D 3/0047* (2013.01); *C11D 3/2082* (2013.01); *C11D 17/0008* (2013.01); *C11D 2111/14* (2024.01); *C11D 2111/44* (2024.01)

(58) Field of Classification Search
CPC . C11D 3/0047; C11D 3/2082; C11D 17/0008; C11D 2111/14; C11D 2111/44; C11D 3/3703
USPC ........................................................ 510/433
See application file for complete search history.

(56) References Cited

U.S. PATENT DOCUMENTS

| | | | | |
|---|---|---|---|---|
| 8,044,156 | B2 | 10/2011 | Tamareselvy et al. | |
| 8,641,827 | B2 | 2/2014 | Blattner et al. | |
| 8,809,250 | B2 | 8/2014 | Parrish et al. | |
| 8,846,593 | B2 * | 9/2014 | Hueffer ................... | C11D 11/02 510/480 |
| 9,062,131 | B2 | 6/2015 | Lepilleur et al. | |
| 9,650,593 | B2 | 5/2017 | Panandiker et al. | |
| 10,435,656 | B2 | 10/2019 | Klinkhammer et al. | |
| 2007/0099816 | A1 * | 5/2007 | Scheuing ............. | C11D 3/3784 510/475 |
| 2009/0324964 | A1 | 12/2009 | Jaynes et al. | |
| 2013/0072419 | A1 * | 3/2013 | Blattner ............... | C11D 3/2044 510/470 |
| 2013/0210695 | A1 * | 8/2013 | Bjelopavlic .............. | C11D 1/66 510/501 |
| 2015/0245986 | A1 * | 9/2015 | Christov ................ | A61K 8/466 510/130 |
| 2019/0002613 | A1 | 1/2019 | Hsu et al. | |
| 2019/0330573 | A1 | 10/2019 | Man et al. | |
| 2020/0255568 | A1 | 8/2020 | Hsu et al. | |
| 2020/0283555 | A1 | 9/2020 | Hsu et al. | |
| 2022/0295789 | A1 | 9/2022 | Sehgal et al. | |

FOREIGN PATENT DOCUMENTS

| | | | | |
|---|---|---|---|---|
| EP | 0971024 | A1 * | 1/2000 | ............... C11D 3/37 |
| EP | 2797413 | B1 | 9/2018 | |
| WO | 2008114232 | A2 | 9/2008 | |

OTHER PUBLICATIONS

International Search Report and Written Opinion in PCT/US2024/035984, mailed Sep. 30, 2024, 13 pages.

* cited by examiner

CLEANING COMPOSITIONS COMPRISING SURFACE MODIFICATION POLYMERS

CROSS-REFERENCE TO RELATED APPLICATION

This application claims priority under 35 U.S.C. § 119 to Provisional Application U.S. Ser. No. 63/511,506, filed on Jun. 30, 2023, which is herein incorporated by reference in its entirety including without limitation, the specification, claims, and abstract, as well as any figures, tables, or examples thereof.

TECHNICAL FIELD

The invention relates to compositions for cleaning a hard surface. Specifically, neutral cleaning compositions comprising a surface modification polymer to beneficially aid in removing typical bathroom soils, such as hard water deposits, at a neutral pH. The neutral cleaning compositions effectively remove and/or otherwise assist in general cleaning of difficult bathroom soils without the harsh effects of a traditional acidic cleaning composition and without requiring PPE. Additionally, use of the cleaning composition beneficially aids in and/or improves subsequent cleanings. Methods for using the cleaning compositions for removing bathroom soils also provided.

BACKGROUND

Hard to clean bathroom soils, such as hard water deposits like soap scum and lime scale, often require a high-powered acidic cleaning composition that is harsh to the user. Conventional neutral bathroom cleaning compositions struggle to remove said stubborn bathroom soils. Both conventional neutral and acidic bathroom cleaning compositions struggle to clean bathroom soils that have built up over time after repeated use of conventional cleaning compositions.

Thus, there exists a need in the art for improved methods and compositions for cleaning bathrooms, specifically a need for neutral cleaning compositions effective against tough bathroom soils.

It is therefore an object of this disclosure to provide cleaning compositions, including neutral liquids comprising a surface modification polymer to enhance soil removal. It is an object of this disclosure to provide cleaning compositions, including neutral liquids comprising a surface modification polymer to aid in effective and efficient cleaning over time, including subsequent uses of the cleaning composition.

It is another object of this disclosure to provide enhanced method of cleaning bathroom fixtures and surfaces comprising use of a neutral bathroom cleaning composition.

Other objects, embodiments and advantages of this disclosure will be apparent to one skilled in the art in view of the following disclosure, the drawings, and the appended claims.

BRIEF SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

Disclosed herein are cleaning compositions comprising a buffer, an alkalinity source, and/or a chelant, a surfactant, an acid, a surface modification polymer, additional functional ingredients, and water. In some embodiments, the cleaning composition comprises from about 1 wt-% to about 80 wt-% of the buffer or alkalinity source or chelant, up to about 30 wt-% of the surfactant, up to about 30 wt-% of the acid, from about 0.1 wt-% to about 40 wt-% of the surface modification polymer, up to about 75 wt-% of the additional functional ingredients, and about 20 wt-% to about 90 wt-% of the water.

In some embodiments, the surface modification polymer is a cationic, hydrophilic surface modification polymer. In some embodiments, the surface modification polymer comprises a polyampholyte. In some embodiments, the surface modification polymer comprises DADMAC and acrylic acid monomers, wherein the molar ratio of DADMAC to acrylic acid is from about 70 to 30 to about 5 to 95. In some embodiments, the surface modification polymer comprises a polyamidoamine. In some embodiments, the surface modification polymer comprises a high molecular weight polyamidoamine with a molecular weight of from about 500 to about 1,000,000 Da, preferably from about 500 to 100,000 Da. In some embodiments, the surface modification polymer comprises a cationically modified guar gum.

In some embodiments, the cleaning composition comprises a buffer. In some embodiments, the buffer comprises sodium citrate dihydrate. In some embodiments, the surfactant comprises a non-ionic surfactant. In some embodiments, the non-ionic surfactant comprises an alkyl polyglucoside. In some embodiments, the alkyl polyglucoside comprises a C8-C10 alkyl polyglucoside and/or a C10-C16 alkyl polyglucoside. In some embodiments, the surfactant comprises a betaine surfactant. In some embodiments, the betaine surfactant comprises a cocamidopropyl betaine. In some embodiments, the acid is an organic acid. In some embodiments, the acid comprises citric acid. In some embodiments, the additional functional ingredients comprise defoaming agents, anti-redeposition agents, bleaching agents, solubility modifiers, tracers, dispersants, metal protecting agents, soil anti-redeposition agents, stabilizing agents, corrosion inhibitors, enzymes, fragrances, dyes, rheology and/or solubility modifiers or thickeners, hydrotropes or couplers, solvents, and/or preservatives.

Disclosed herein is a method of cleaning a hard surface comprising contacting a hard surface with the cleaning composition disclosed here. In some embodiments, the method comprises first diluting the cleaning composition form a ready-to-use cleaning composition. In some embodiments, the ready-to-use cleaning compositions comprises from about 0.001 wt-% to about 10 wt-% of the buffer, alkalinity source, and/or chelant; up to about 10 wt-% of the surfactant; up to about 10 wt-% of the acid; from about 0.001 to about 20 wt-% of the surface modification polymer; up to about 25 wt-% of the additional functional ingredients; and from about 70 wt-% to about 99.99 wt-% of the water. In some embodiments, the method further comprises rinsing the surface after contacting the surface with the cleaning composition. In some embodiments, the method comprises using mechanical force during the contacting step. In some embodiments, the method removes hard water deposits by at least about 50%, at least about 65%, at least about 70%, and preferably at least about 90% or at least about 95%. In some embodiments, the surface is contacted with the bathroom cleaning composition for at least about 10 seconds, at least about 30 seconds, at least about 1 minute, about 10 minutes, or between about 10 seconds and 10 minutes. In some embodiments, the hard surface is a bathroom surface.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
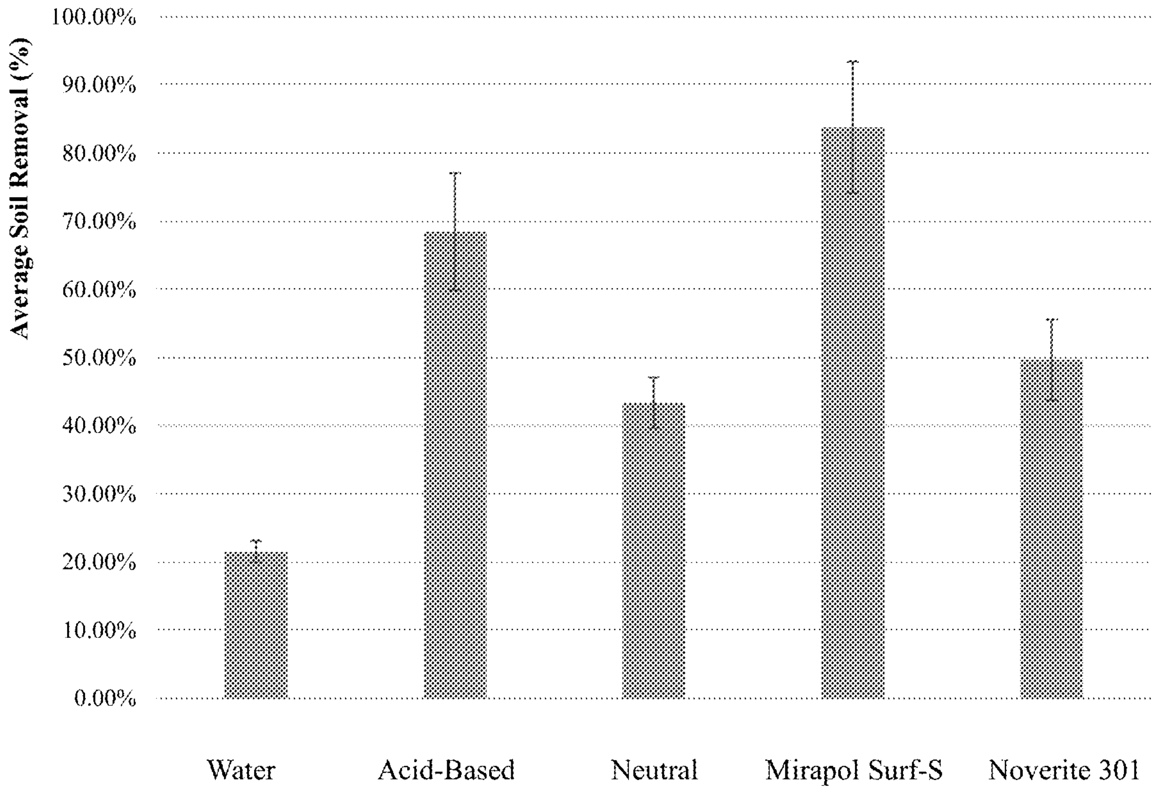
FIG. 1 is a graph of average percent soap scum removal for each formulation tested in Example 1.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure. An artisan of ordinary skill in the art need not view, within isolated figure(s), the near infinite number of distinct permutations of features described in the following detailed description to facilitate an understanding of the present disclosure.

DETAILED DESCRIPTION

The embodiments are not limited to particular neutral bathroom cleaners comprising a surface modification polymer and methods of using the same. The present disclosure is not to be limited to that described herein, which can vary and are understood by skilled artisans. No features shown or described are essential to permit basic operation of the present disclosure unless otherwise indicated.

It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, a description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

As used herein, the term "and/or", e.g., "X and/or Y" shall be understood to mean either "X and Y" or "X or Y" and shall be taken to provide explicit support for both meanings or for either meaning, e.g. A and/or B includes the options i) A, ii) B or iii) A and B.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

The methods and compositions of the present disclosure may comprise, consist essentially of, or consist of the components and ingredients of the present disclosure as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Unless defined otherwise, all technical and scientific terms used above have the same meaning as commonly understood by one of ordinary skill in the art to which embodiments of the present disclosure pertain.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The terms "invention" or "present invention" are not intended to refer to any single embodiment of the particular invention but encompass all possible embodiments as described in the specification and the claims.

The term "about," as used herein, refers to variation in the numerical quantity that can occur, for example, through typical measuring techniques and equipment, with respect to any quantifiable variable, including, but not limited to, mass, volume, time, temperature, and pH. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the term "cleaning" refers to a method or composition used to facilitate or aid in soil removal, stain removal, bleaching, microbial population reduction, and any combination thereof.

The term "hard surface" refers to a solid, substantially non-flexible surface such as a countertop, tile, floor, wall, panel, window, plumbing fixture, kitchen and bathroom furniture, appliance, engine, circuit board, and dish. Hard surfaces may include for example, health care surfaces, food processing surfaces, bathroom surfaces, and the like, and may be interior or exterior. The term "bathroom fixture" or "bathroom surface" refers to a hard surface specifically in a bathroom.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

As used herein, the term "exemplary" refers to an example, an instance, or an illustration, and does not indicate a most preferred embodiment unless otherwise stated.

The term "generally" encompasses both "about" and "substantially."

As used herein, the term "soil" or "stain" refers to any soil, including, but not limited to, non-polar oily and/or hydrophobic substances which may or may not contain particulate matter such as industrial soils, mineral clays, sand, natural mineral matter, carbon black, graphite, kaolin, hard water deposits, environmental dust, and/or food based soils such as blood, proteinaceous soils, starchy soils, fatty soils, cellulosic soils, etc., and the like. Hard water deposits includes, but is not limited to, lime scale and soap scum.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

The term "substantially" refers to a great or significant extent. "Substantially" can thus refer to a plurality, majority, and/or a supermajority of said quantifiable variable, given proper context.

As used herein, the term "free" or "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "surfactant" or "surface active agent" refers to an organic chemical that when added to a liquid changes the properties of that liquid at a surface. Surfactants are compounds that contain a lipophilic segment and a hydrophilic segment, which when added to water or solvents, reduces the surface tension of the system. An "extended chain surfactant" is a surfactant having an intermediate polarity linking chain, such as a block of poly-propylene oxide, or a block of poly-ethylene oxide, or a block of poly-butylene oxide or a mixture thereof inserted between the surfactant's conventional lipophilic segment and hydrophilic segment.

Cleaning Compositions

According to embodiments, the cleaning compositions disclosed herein are liquid concentrates or ready-to-use (RTU) solutions. In embodiments, the cleaning compositions include water, buffer or alkalinity or chelant, a surfactant, an acid, a surface modification polymer, and any number of additional functional ingredients. Exemplary cleaning compositions are shown in Table 1 for concentrate liquid formulations and Table 2 for RTU formulations in weight percentage. While the components may have a percent actives of 100%, it is noted that Table 1 and Table 2 do not recite the percent actives of the components, but rather, recites the total weight percentage of the raw materials (i.e. active concentration plus inert ingredients).

TABLE 1

(concentrate formulations)

| Material | First Exemplary Range wt.-% | Second Exemplary Range wt.-% | Third Exemplary Range wt.-% |
|---|---|---|---|
| Buffer or Alkalinity or Chelant | 1-80 | 5-50 | 10-30 |
| Surfactant | 0-30 | 1-20 | 5-15 |
| Acid | 0-30 | 0-10 | 0.1-5 |
| Surface Modification Polymer | 0.1-40 | 5-40 | 10-40 |
| Water | 20-90 | 20-60 | 25-45 |
| Additional Functional Ingredients | 0-80 | 0-50 | 0.1-10 |

TABLE 2

(RTU formulations)

| Material | First Exemplary Range wt.-% | Second Exemplary Range wt.-% | Third Exemplary Range wt.-% |
|---|---|---|---|
| Buffer or Alkalinity or Chelant | 0.001-10 | 0.01-5 | 0.1-5 |
| Surfactant | 0-10 | 0.1-5 | 0.1-2 |
| Acid | 0-10 | 0-5 | 0.001-1 |
| Surface Modification Polymer | 0.001-20 | 0.01-10 | 0.1-5 |
| Water | 70-99.99 | 80-99.99 | 95-99 |
| Additional Functional Ingredients | 0-90 | 0-50 | 0-5 |

The cleaning compositions can be provided as a concentrate. The term "concentrate" refers to a relatively concentrated form of the composition that can be diluted with a diluent to form a use composition. An exemplary diluent that can be used to dilute the concentrate to form the use composition is water. In general, the use composition refers to the composition that contacts an article to provide a desired action. For example, a bathroom cleaning composition that is provided as a use composition can contact a bathroom hard surface for cleaning the surface. In addition, the concentrate or the diluted concentrate can be provided as the use composition. For example, the concentrate can be referred to as the use composition when it is applied to an article without dilution. In many situations, it is expected that the concentrate will be diluted to provide a use composition that is then applied to an article.

The cleaning compositions are preferably neutral compositions with a pH between about 4 and about 10. In an embodiment, the compositions have a use solution pH between about 5 and about 9, or between about 6 and about 9, or about 7. In an embodiment, the pH of the concentrate liquid composition, as shown in Table 1, is between about 4 and about 10, or between about 5 and about 9, to provide the neutral use conditions. In addition, without being limited according to the disclosure, all ranges recited are inclusive of the numbers defining the range and include each integer within the defined range.

Surface Modification Polymer

The cleaning compositions include a surface modification polymer to aid in soil removal at the time of use, and in subsequent uses.

In an embodiment, the surface modification polymer comprises a cationic hydrophilic polymer or copolymer. In an embodiment, the surface modification polymer is a cationic hydrophilic polymer or copolymer. Without being limited to a particular theory, it is believed that the cationic nature of the polymer allows the polymer, and cleaning composition, to cling to a hard surface, such as a bathroom fixture. The polymer thereafter acts as a barrier film on the surface following use of the cleaning composition, providing a residual cleaning benefit aiding in subsequent cleaning.

In an embodiment, the polymer includes an acidic monomer having or capable of forming an anionic charge and a monomer having a permanent cationic charge or is capable of forming a cationic charge upon protonation. In an embodiment, the polymer is a polyampholyte. In an embodiment, the polymer is an aqueous based acrylic acid amine-functional polymer. An example of such a polymer is a quaternized ammonium acrylamide acrylic acid copolymer.

In an embodiment, the surface modification polymer comprises includes a water-soluble or water-dispersible copolymer comprising, in the form of polymerized units: (a) at least one monomer compound of general formula:

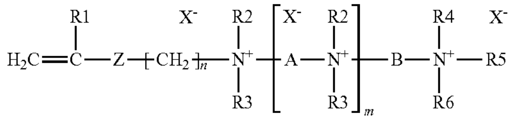

wherein R1 is a hydrogen atom or a methyl or ethyl group; R2, R3, R4, R6 and R6 are linear or branched C1-C6, preferably C1-C4, alkyl, hydroxyalkyl or aminoalkyl groups; m is an integer from 0 to 10, preferably from 0 to 2; n is an integer from 1 to 6, preferably 2 to 4; Z represents a —C(O)O— or —C(O)NH— group or an oxygen atom; A represents a (CH2) p group, p being an integer from 1 to 6, preferably from 2 to 4; B represents a linear or branched C2-C12, preferably C3-C6, polymethylene chain optionally interrupted by one or more heteroatoms or heterogroups, in particular O or NH, and optionally substituted by one or more hydroxyl or amino groups, preferably hydroxyl groups; X, which are identical or different, represent counterions; and (b) at least one hydrophilic monomer carrying a functional group with an acidic nature which is copolymerizable with (a) and which is capable of being ionized in the application medium; and (c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

In an embodiment, the polymer comprises, in the form of polymerized units: (a) at least one monomer compound of general formula:

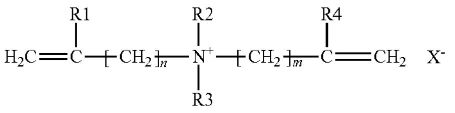

Wherein R1 and R4, independently, represent a hydrogen atom or a linear or branched C1-C6 alkyl group; R2 and R3, independently, represent an alkyl, hydroxyalkyl or amino alkyl group in which the alkyl group is a linear or branched C1-C6 chain, preferably a methyl group; n and m are integers between 1 and 3; X represent counterions which are compatible with the water-soluble or water-dispersible nature of the polymer; (b) at least one hydrophilic monomer bearing a function of acidic nature which is co-polymerizable with (a) and capable of ionizing in the application medium; and (c) optionally, at least one hydrophilic monomer compound containing ethylenic unsaturation and of neutral charge, bearing one or more hydrophilic groups, which is co-polymerizable with (a) and (b), in which the molar ratio of (a) to (b) is between about 70:30 and about 5:95, or from about 60:40 to about 10:90. Preferably, R1 and R4 represent hydrogen, R2 and R2 represent methyl, and m and n are equal to 1. In an embodiment, $X^-$ is halogen, sulfate, hydrogen sulfate, phosphate, citrate, formate and acetate.

In an embodiment, the polymer comprises, in the form of polymerized units, (a) compound according to the general formula:

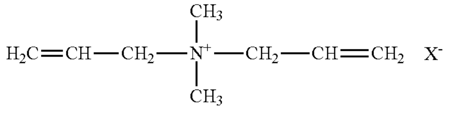

Wherein X— halogen, sulfate, hydrogen sulfate, phosphate, citrate, formate and acetate. In a preferred embodiment, $X^-$ is $Cl^-$, this monomer if diallyldimethylammonium chloride (DADMAC).

In preferred embodiment, monomers (b) comprise acrylic acid, methacrylic acid, α-ethacrylic acid, β,β-dimethacrylic acid, methylenemalonic acid, vinyl acetic acid, allylacetic acid, ethylideneacetic acid, propylideneacetic acid, crotonic acid, maleic acid, fumaric acid, itaconic acid, citraconic acid, mesaconic acid, N-methacryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl, methacrylate, phosphopropyl methacrylate and phosphonopropyl methacrylate, and the ammonium and alkali metal salts of these acids.

In an embodiment, monomer (c) comprises acrylamide, vinyl alcohol, C1-C4 alkyl esters of acrylic acid and of methacrylic acid, C1-C4 hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters. In an embodiment, the surface modification polymer does not comprise an acrylamide monomer.

In an embodiment, the polymer comprises monomer (a) from between 5 mol % and 60 mol %, preferably 20 mol % to 50 mol %; monomer (b) from between 10 mol % and 95 mol %, preferably 20 mol % to 80 mol %; and monomer (c) from between 0 mol % and 50 mol %, preferably 5 mol % to 30 mol %. In an embodiment, the molar ratio of a to b is between about 70:30 and about 10:90, or from about 60:40 to about 20:80. In an embodiment, the polymer does not comprise monomer (c) and is not a terpolymer.

In an embodiment, the polymers are nitrogen-containing polymers such as quaternized ammonium acrylamide acrylic acid copolymers, e.g., diallyl dimethyl ammonium chloride/acrylamide/acrylic acid copolymer. A preferred embodiment of the acidic monomer (a) includes acrylic acid and methylacrylic acid. A preferred embodiment of the cationic monomer (b) is methacryl-amido (propyl)-trimethyl ammonium chloride. A preferred neutral monomer, when present, is dimethyl amidoethyl methacrylate. Commercially available hydrophilic polymers useful in the present composition include those sold under the tradename Mirapol Surf S produced by Rhodia. A preferred Mirapol Surf S polymer includes Mirapol Surf S-110.

In an embodiment, the polymer has a molecular weight of at least about 500, at least about 1000, at least about 10,000, up to about 20,000,000, or up to about 10,000,000 Da.

In an embodiment, the polymer comprises a polyamidoamine. In an embodiment, the polyamidoamine is a high molecular weight polyamidoamine with a molecular weight of at least about 500, at least about 1000, at least about 10,000, at least about 100,000, or at least about 1,000,000 Da. In an embodiment, the polyamidoamine has a molecular weight of from about 500 to about 1,000,000 Da, or preferably from about 500 to about 100,000 Da. In an embodiment the polyamidoamine comprises secondary amines in the backbone. In an embodiment, the polyamidoamine is not quaternized. Exemplary polyamidoamines can be produced through the step growth polymerization of polyamine and diacid monomers. Exemplary polyamidoamines include polymers produced by the condensation of diethylenetriamine and adipic acid as described in U.S. Pat. No. 8,747,789. Exemplary polyamidoamines can also be produced from polyamine and amine-reactive carboxylic acid monomers. Examples of this method include polymers produced by the reaction of tetraethylenepentamine and acrylic acid. Exemplary polyamidoamines can also be produced using diester comonomers, such as dimethylglutarate, in place of the diacid comonomers. Exemplary uncrosslinked polyamidoamines comprise a molecular weight of about 2,000 to about 20,000 Da. Polyamidoamines can be chemically modified to increase their molecular weight up to about one million Da and/or to add functional properties to the polymer so that they perform better in certain applications, as described in U.S. Pat. No. 8,246,781.

In an embodiment, the surface modification polymer comprises a cationic gum-based polysaccharide comprising a cationic guar or cationic guar derivative (such as cationic guar ethers and cationic guar esters), alone or in mixture. Preferably the cationic polysaccharide is a cationic guar gum. Exemplary cationic guars include those obtained according to derivatization techniques such as those described in U.S. Pat. No. 5,756,720; EP0,686,643, EP1501873 and US2003/0044479. Additional modified gum-based polysaccharides comprise a hydroxypropyl-modified guar or hydroxypropyl-modified guar derivative (such as a hydroxypropyl guar ethers and hydroxypropyl guar esters), alone or in mixture. Exemplary guar gums are hydroxypropyl-modified guars such as guar gum 2-hydroxypropyl ether or cationically modified guars such as guar gum 2 hydroxy-3-(trimethylammonium) propyl ether, including those described in U.S. Pat. No. 9,624,455, or a combination thereof. In an embodiment the surface modification polymer is a cationically modified guar gum. A suitable cationically modified guar gum comprises guar gum 2 hydroxy-3-trimethylammonium) propyl ether chloride, available as MIRAPOL® Surf N ADW, JAGUAR® C 17, JAGUAR® C 500, JAGUAR® C 13S, JAGUAR® C 14S, JAGUAR® Excel, JAGUAR® Optima, and JAGUAR® C 1000 (Solvay), N-HANCE™ 3215 (Ashland), and CESMATIC™ DP4. In an embodiment the surface modification polymer is 2-hydroxypropyl ether, such as JAGUAR® 8000, JAGUAR® 8012, JAGUAR® 8021, JAGUAR® 8060, JAGUAR® 8111, JAGUAR® NHP 120, JAGUAR® HP 8, JAGUAR® HP 11, JAGUAR® HP 60, JAGUAR® HP 80, JAGUAR® HP 120 and JAGUAR® HP 105 (Solvay).

In some embodiments, the concentrate cleaning compositions comprise about 0.1 wt-% to about 40 wt-%, from about 5 wt-% to about 40 wt-%, from about 10 wt-% to about 40 wt-%, or from about 15 wt-% to about 40 wt-% of the surface modification polymer. It is to be understood that all values and ranges between these values and ranges are encompassed by the present invention as well as dilutions of the concentrate.

Alkalinity Source

In an embodiment, the cleaning compositions comprise an alkalinity source. Examples of suitable alkaline sources for use in the compositions include hydroxides, amines, alkanol amines, carbonates, bicarbonates and silicates. For example, the source of alkalinity can include sodium, hydroxide, sodium silicate, sodium metasilicate, sodium orthosilicate, sodium phosphate, sodium polyphosphate, sodium borate, sodium carbonate, sodium bicarbonate, potassium hydroxide, potassium silicate, potassium metasilicate, potassium orthosilicate, potassium phosphate, potassium polyphosphate, potassium borate, potassium carbonate, potassium bicarbonate, lithium hydroxide, lithium silicate, lithium metasilicate, lithium orthosilicate, lithium phosphate, lithium polyphosphate, lithium borate, lithium carbonate, lithium bicarbonate, 2-(2-aminoethoxy) ethanol, monoethanolamine, diethanolamine, triethanolamine, mixed isopropanolamines, morpholine, n,n-dimethyl ethanolamine and combinations thereof.

In some embodiments, the concentrate cleaning compositions comprise about 1 wt-% to about 80 wt-%, from about 5 wt-% to about 50 wt-%, from about 5 wt-% to about 40 wt-%, or from about 10 wt-% to about 30 wt-% of the alkalinity. It is to be understood that all values and ranges between these values and ranges are encompassed by the present invention as well as dilutions of the concentrate.

Buffer

In an embodiment, the cleaning composition comprises a buffer.

Suitable buffers can include, but are not limited to, glycine buffers, alcohol amines (e.g. 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like), ethanolamines, C1-C6 polycarboxylic acids, alkali metal carbonates, bicarbonates, sesquicarbonates, and mixtures thereof. In an embodiment, the buffer comprises sodium citrate dihydrate (trisodium 2-hydroxy-1,2,3-propanetricarboxylate dihydrate).

In some embodiments, the concentrate cleaning compositions comprise about 1 wt-% to about 80 wt-%, from about 5 wt-% to about 50 wt-%, from about 5 wt-% to about 40 wt-%, or from about 10 wt-% to about 30 wt-% of the buffer. It is to be understood that all values and ranges between these values and ranges are encompassed by the present invention as well as dilutions of the concentrate.

Chelant

In an embodiment, the cleaning compositions comprise a chelant (or a sequestrant or builder). In general, a chelant or chelating agent is a molecule capable of coordinating (i.e., binding) the metal ions commonly found in water sources to prevent the metal ions from interfering with the action of the other ingredients. Examples of chelating agents include phosphonic acid and phosphonates, phosphates, gluconic acid and gluconates, aminocarboxylates and their derivatives, pyrophosphates, ethylenediamine and ethylenetriamine derivatives, hydroxyacids, and mono-, di-, and tricarboxylates and their corresponding acids. In certain embodiments the composition is phosphate free.

Exemplary chelants include, but are not limited to: sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N—N-diacetic acid trisodium salt (MGDA), and iminodisuccinate sodium salt (IDS).

In some embodiments, the concentrate cleaning compositions comprise about 1 wt-% to about 80 wt-%, from about 5 wt-% to about 50 wt-%, from about 5 wt-% to about 40 wt-%, or from about 10 wt-% to about 30 wt-% of the chelant. It is to be understood that all values and ranges between these values and ranges are encompassed by the present invention as well as dilutions of the concentrate.

Surfactants

In an embodiment, the cleaning composition comprises a surfactant. Suitable surfactants can include anionic, cationic, amphoteric, zwitterionic, and/or nonionic surfactants. The surfactant or mixture of surfactants can have foaming or defoaming characteristics suitable for a desired cleaning and/or sanitizing application. The surfactant or surfactant system can be selected depending upon the particular soil that is to be removed. For a discussion of surfactants, see Kirk-Othmer, Encyclopedia of Chemical Technology, Third Edition, volume 8, pages 900-912. Surfactants can be used alone or in combination. It should be understood that the selection of particular surfactants or combinations of surfactants can be based on a number of factors including compatibility with the surface or object to be cleaned at the intended use concentration and the intended environmental conditions including temperature and pH.

Anionic surfactants suitable for use with the cleaning compositions include alkylbenzene sulfonates, such as linear alkylbenzene sulfonates, alkyl carboxylates, paraffin sulfonates and secondary n-alkane sulfonates, sulfosuccinate esters and sulfated linear alcohols. Additional sulfonated anionics include alkyl sulfonates or disulfonates, alkyl aryl sulfonates, alkyl naphthalene sulfonates, alkyl diphenyl oxide disulfonates, and the like. In an embodiment, the cleaning composition does not comprise an anionic surfactant.

Zwitterionic or amphoteric surfactants suitable for use with the cleaning compositions include beta-N-alkylamino-propionic acids, n-alkyl-beta-iminodipropionic acids, imidazoline carboxylates, n-alky-betaines, amine oxides, sulfobetaines and sultaines.

Amphoteric surfactants suitable for use with the cleaning compositions include derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989) and U.S. Pat. No. 9,663,431, which are herein incorporated by reference in its entirety. The first class includes acyl/dialkyl ethylenediamine derivatives (e.g., 2-alkyl hydroxyethyl imidazoline derivatives) and their salts. The second class includes N-alkylamino acids and their salts. Some amphoteric surfactants can be envisioned as fitting into both classes.

Zwitterionic surfactants suitable for use in the present compositions includes a betaine of the general structure:

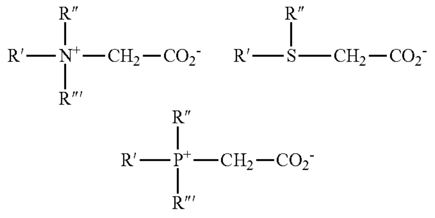

Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2 N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

In an embodiment, the cleaning composition comprises a betaine surfactant. In an embodiment, the betaine surfactant comprises cocamidopropyl betaine.

Nonionic surfactants suitable for use with the cleaning compositions include alcohol alkoxylates having EO, PO and BO blocks, fatty acid alkoxylate, alkyl phenol alkoxylates, and polyether (also known as polyalkylene oxide, polyoxyalkylene or polyalkylene glycol) compounds. More particularly, the polyether compounds are generally polyoxypropylene or polyoxyethylene glycol compounds. Typically, the surfactants suitable for use with the cleaning compositions are synthetic organic polyoxypropylene (PO)-polyoxyethylene (EO) block copolymers. These surfactants have a diblock polymer comprising an EO block and a PO block, a center block of polyoxypropylene units (PO), and having blocks of polyoxyethylene grated onto the polyoxypropylene unit or a center block of EO with attached PO blocks.

In an embodiment, the cleaning composition comprise a nonionic surfactant comprising an alkyl polyglycoside. Suitable alkyl polyglycosides include but are not limited to alkyl polyglucosides and alkyl polypentosides. Alkyl polyglycosides are bio-based non-ionic surfactants which have wetting and detersive properties. Commercially available alkyl polyglycosides may contain a blend of carbon lengths. In an embodiment, the cleaning composition comprises a C8-C10 alkyl polyglucoside. In an embodiment, the cleaning composition comprises a C10-C16 alkyl polyglucoside. The cleaning composition, when provided as a concentrate, can include alkyl polyglycoside in an amount sufficient to provide a use solution having desired wetting and detersive properties after dilution with water.

Cationic surfactants suitable for use with the cleaning compositions can include alkylamines and their salts, alkyl imidazolines, ethoxylated amines, and quaternaries, such as alkylbenzyldimethylammonium salts, alkyl benzene salts, heterocyclic ammonium salts, tetra alkylammonium salts, and the like. Cationics further include compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom. Additional description can be in "Surfactant Encyclopedia", Cosmetics & Toiletries, Vol. 104 (2) 86-96 (1989) and U.S. Pat. No. 9,663,431, which are herein incorporated by reference in its entirety. In an embodiment, the cleaning composition does not comprise a cationic surfactant, outside of the surface modification polymer.

In some embodiments, the concentrate cleaning compositions comprise about 0 wt-% to about 30 wt-%, from about 1 wt-% to about 20 wt-%, from about 5 wt-% to about 25 wt-%, or from about 10 wt-% to about 30 wt-% of the surfactant. It is to be understood that all values and ranges between these values and ranges are encompassed by the present invention as well as dilutions of the concentrate.

Acid Source

In an embodiment, the cleaning compositions comprise an acid source. Acid sources can include organic acids, inorganic acids, or a mixture thereof. Examples of acid sources include, for example, citric acid, formic acid, glycolic acid, gluconic acid, phosphoric acid, hydrochloric acid, sulfuric acid, nitric acid, acetic acid or peroxycarboxylic acids. In an embodiment one or more organic acids are included as the acid source, including for example lactic acid, gluconic acid, formic acid, citric acid, acetic acid, oxalic acid, uric acid, malic acid, tartaric acid, or the like. In an embodiment, the cleaning composition comprises citric acid.

In some embodiments, the concentrate cleaning compositions comprise about 0 wt-% to about 30 wt-%, from about 1 wt-% to about 30 wt-%, from about 1 wt-% to about 20 wt-%, from about 5 wt-% to about 20 wt-%, or from about 5 wt-% to about 15 wt-% of the acid source. It is to be understood that all values and ranges between these values and ranges are encompassed by the present invention as well as dilutions of the concentrate.

Additional Functional Ingredients

In an embodiment, the cleaning composition further comprises various functional components suitable for uses disclosed herein. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used.

In some embodiments, the cleaning composition may comprise optical brighteners, defoaming agents, anti-redeposition agents, bleaching agents, solubility modifiers, tracers, dispersants, metal protecting agents, soil anti-redeposition agents, stabilizing agents, corrosion inhibitors, enzymes, fragrances, dyes, rheology and/or solubility modifiers or thickeners, hydrotropes or couplers, solvents, preservatives, additional cleaning agents and the like. In an embodiment, the cleaning composition comprises one or more of a dye, fragrance, and/or preservative. In an embodiment, the cleaning composition does not include glycerine, or is substantially free of glycerine.

In an embodiment, the cleaning compositions comprise a preservative. Suitable preservatives include, but are not limited to, the antimicrobial classes such as phenolics, quaternary ammonium compounds, metal derivatives, amines, alkanol amines, nitro derivatives, analides, organosulfur and sulfur-nitrogen compounds and miscellaneous compounds. Exemplary phenolic agents include pentachlorophenol, orthophenylphenol. Exemplary quaternary antimicrobial agents include benzalconium chloride, cetylpyridiniumchloride, amine and nitro containing antimicrobial compositions such as hexahydro-1,3,5-tris(2-hydroxyethyl)-s-triazine, dithiocarbamates such as sodium dimethyldithiocarbamate, and a variety of other materials known in the art for their microbial properties. Other exemplary preservatives include gluteraldehyde, Bronopol, silver, and isothiazolones such as methylisothiazolinone, and salts of pyrithione, including, for example sodium pyrithione. Preferred preservatives include those sold under the tradename NEOLONE™.

In some embodiments, the concentrate cleaning compositions comprise about 0 wt-% to about 80 wt-%, from about 0 wt-% to about 50 wt-%, from about 0.1 wt-% to about 30 wt-%, from about 0.1 wt-% to about 20 wt-%, or from about 0.1 wt-% to about 10 wt-% of the additional functional ingredient. It is to be understood that all values and ranges between these values and ranges are encompassed by the present invention as well as dilutions of the concentrate.

Water

The cleaning compositions contain water. The water can be deionized water or softened water. The water typically makes up the remaining volume after the addition of all other ingredients (i.e. shown in compositions as q.s.). In some embodiments, the concentrate cleaning compositions comprise about 20 wt-% to about 90 wt-%, from about 20 wt-% to about 60 wt-%, from about 20 wt-% to about 50 wt-%, from about 25 wt-% to about 50 wt-%, or from about 25 wt-% to about 45 wt-% of the water. It is to be understood that all values and ranges between these values and ranges are encompassed by the present invention as well as dilutions of the concentrate.

Methods of Use

The cleaning compositions are suited for cleaning, sanitizing and/or disinfecting various surfaces and objects. The cleaning compositions are efficacious in cleaning and removing soils from such surfaces and objects, including for example difficult to remove soils, including hard water deposits such as lime scale and soap scum. The cleaning compositions are particularly effective for removing hard water deposits, for example from bathroom fixtures and surfaces.

Disclosed herein is a method of cleaning comprising contacting a hard surface with any of the cleaning compositions disclosed herein. In an embodiment, the method of cleaning comprises contacting a hard surface in a bathroom with any of the cleaning compositions disclosed herein. In an embodiment, the method of cleaning comprises contacting a hard surface with any of the cleaning compositions disclosed herein and removing soils from said surface. In an embodiment. The method of cleaning comprises contacting a hard surface with any of the cleaning compositions disclosed herein, and removing hard water deposits from said surface.

In embodiments, the compositions having a neutral pH and do not require PPE, while beneficially providing increased efficacy for soil removal as compared to the conventional acidic cleaning compositions.

In embodiments, the cleaning compositions can be used as a RTU concentrate or a use solution.

In embodiments, the cleaning compositions can be used as a pretreatment, soak, or spray. The composition or use solutions thereof can be applied using a variety of methods and conventional application techniques, which will vary depending upon the application as a soak, spray, or the like. These methods can operate on an object, surface, or the like, by contacting the object or surface with the composition. Contacting can comprise any of numerous methods for applying a liquid, such as spraying the compound, immersing the object in the compound, foam or gel treating the object with the compound, or a combination thereof. Without being limited to the contacting method, a concentrate or use composition can be applied to or brought into contact with an object or surface by any conventional method or apparatus for applying a liquid composition to an object. For example, the surface can be wiped with, sprayed with, foamed on, and/or immersed in the compositions, or use compositions made from the concentrated compositions. The liquid compositions can be sprayed, foamed, or wiped onto a surface; the compound can be caused to flow over the surface, or the surface can be dipped into the compound. Contacting can be manual or by machine.

In an embodiment, the method of cleaning comprises a step of contacting a surface in need of cleaning with the composition for a sufficient amount of time such that the composition penetrates into the soil to be removed. The length of time required for soil penetration will depend on the thickness of the soil as well as the relative composition of the soil. The cleaning compositions can be in contact with a surface or object for a sufficient amount of time to clean the surface or object. In an aspect, the surface or object is contacted with the composition for at least about 10 seconds, 30 seconds, 1 minute, at least about 10 minutes, or between about 10 minutes and about 20 minutes.

In an embodiment, the method of cleaning comprises a step of wiping off the treated surface or object with a rag, towel, sponge, or other item (e.g., a disposable paper towel or sponge). In some embodiments involving heavy soil deposits or stains, the composition may be left on the soiled surface until it has effectively loosened the soil deposits or stains, after which it may be wiped off, rinsed off, or otherwise removed. For particularly heavy deposits of such undesired stains, multiple applications may also be used.

In an embodiment, the method of cleaning comprises using mechanical force during the contacting step. For example, for removing certain soils or stains from the surface or object additional force may need to be applied, e.g., applying a water source and/or mechanical force to assist in removing soils. In an embodiment, the method of cleaning comprises using mechanical force during the contacting step and removing hard water deposits from said contacted surface.

In an embodiment, the method of cleaning comprises a step of rinsing off the treated surface or object with water.

The compositions and methods described herein beneficially remove soils by at least about 50%, at least about 65%, at least about 70%, and preferably at least about 90% or at least about 95%. The compositions and methods described herein beneficially remove hard water deposits by at least about 50%, at least about 65%, at least about 70%, and preferably at least about 90% or at least about 95%. Beneficially, the composition and methods described herein provide substantially similar or superior cleaning efficacy compared to highly acidic compositions.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

The materials used in the following Examples are provided herein:

- A commercially available acid-based bathroom cleaner, from Ecolab.
- Mirapol Surf-S 110: pDADMAC/AA surface modification polymer available from Solvay.
- Noverite 301: aqueous cationic hydrophilic copolymer, available from Lubrizol.
- Ultrazine NA: sodium lignosulfonate, available from Borregaard.
- P1: polyamidoamine surface modification polymer.
- P2: sodium lignosulfonate surface modification polymer.
- P3: polyethylenimine surface modification polymer.
- P4: pDADMAC surface modification polymer.
- P5: pDADMAC/AA surface modification polymer
- Commercially available from multiple sources: sodium citrate dihydrate, C8-C10 alkyl polyglucoside, cocamidopropyl betaine (30%), C10-C16 alkyl polyglucoside (50%), citric acid (50%), Neolone M-10 (1-methyl-4-isothiazolin-3-one).

Example 1

Four large 4-inch by 3-inch glass slides were pretreated per formulation to be tested as follows. About 0.15 g of RTU solution was applied to each slide with a Kimwipe. The slides were dried overnight then weighed on an analytical balance and the weight of the pretreated slide was recorded.

Synthetic soap scum was prepared comprising distilled water, casein protein, soap, vegetable shortening, kaolin clay, 50% NaOH, and $MgCl_2$, $CaCl_2$), and $NaHCO_3$ for hardness. Each slide was soiled with 0.30 g of synthetic soap scum and then dried overnight. After drying overnight, the slides were baked in an oven at 300° F. for 20 minutes. The slides were weighed on an analytical balance and the weight of the soiled slide recorded.

The slides were cleaned using a Garner machine. 500 g of the formulation to be tested was prepared according to the desired concentration. A small amount was placed into a spray bottle and the remaining into an 800 mL beaker. Two sponges were soaked in the solution until completely soaked through and then wrung out by hand. 15 g of the formulation was evenly applied over one side of the sponge and then placed in the carriage with the "product-applied" side down. The slides were placed into the slide template. 5 full sprays of product were sprayed onto each test slide and allowed to dwell on the slide for 30 seconds. The Garner was run for 15 cycles. Once finished, the slides were removed, rinsed under DI water, and then dried overnight. The slides were weighed on an analytical balance and the weight of each cleaned slide recorded. Average soap scum removal, or average weight loss, was then calculated and photos taken of the slides.

The formulations tested include a negative control formulation of water only, a positive control formulation which is a commercially available conventional acid-based formulation, a neutral cleaner according to Table 3, and the neutral cleaner containing two different commercially available surface modification polymers: Mirapol Surf-S 110 and Noverite 301. The tested RTU neutral formulations are shown in Table 3. The weight percentages for each surface modification polymer were adjusted so that each formulation had the same amount of surface modification polymer actives.

FIG. 1 depicts the average percent soap scum removal for each tested formulation. After 15 cycles, the formulations containing Mirapol Surf-S 110 and Noverite 301 had significantly greater soap scum removal than the neutral cleaner without the surface modification polymer. The formulation with Mirapol Surf-S 110 even removed more soap scum than the acid-based cleaner.

Figure 2:
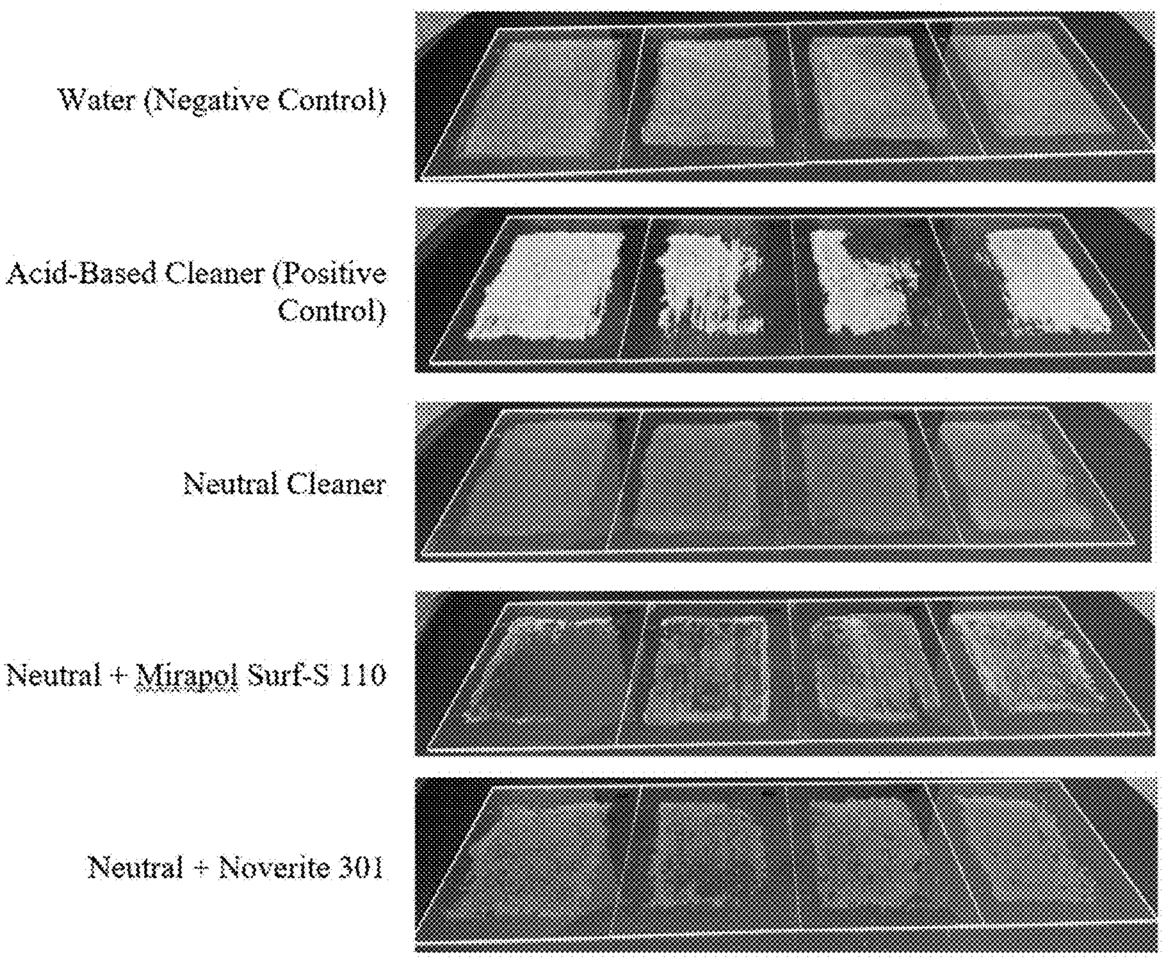
FIG. 2 shows images of slides after cleaning with the formulations tested in Example 1.

FIG. 2 shows photographs of the slides after cleaning. Visually, the cleaning formulations with either Mirapol Surf-S 110 or Noverite 301 resulted in increased soil removal. Visual results are as important or more so than the quantitative results, as visual soil removal is what is perceived by the person cleaning. The results indicate that a cationic, hydrophilic surface modification polymer can increase the soil removal capacity of a neutral bathroom cleaner, and can meet or exceed the capabilities of conventional acid-based cleaners.

TABLE 3

| Ingredient | Neutral Cleaner (wt-%) | Neutral Cleaner + Mirapol Surf-S 110 (wt-%) | Neutral Cleaner + Noverite 301 (wt-%) |
|---|---|---|---|
| Sodium Citrate Dihydrate | 0.5-2 | 0.5-2 | 0.5-2 |
| C8-C10 Alkyl Polyglucoside | 0.1-0.5 | 0.1-0.5 | 0.1-0.5 |
| Cocamidopropyl Betaine (30%) | 0.01-0.15 | 0.01-0.15 | 0.01-0.15 |
| C10-C16 Alkyl Polyglucoside (50%) | 0.1-0.25 | 0.1-0.25 | 0.1-0.25 |
| Citric Acid (50%) | 0.005-0.02 | 0.005-0.02 | 0.005-0.02 |
| Additional Ingredients | 0.001-0.02 | 0.001-0.02 | 0.001-0.02 |
| Surface Modification Polymer | | 2 | 0.5 |
| Water | q. s. | q. s. | q. s. |
| Sum | 100 | 100 | 100 |

Example 2

Slides were prepared and formulations were tested according to the method outlined in Example 1. The formulations tested include a negative control formulation of water only, a positive control formulation which is a commercially available, conventional acid-based formulation, a neutral cleaner, and the neutral cleaner containing two different commercially available surface modification polymers: Mirapol Surf-S 110 and Noverite 301. These are the same formulations as in Example 1 according to Table 3. Additionally, three formulations according to Table 4 were tested, each formulation is the neutral cleaner with a different surface modification polymer. Ultrazine NA and P2 are sodium lignosulfonate surface modification polymers and P1 is a polyamidoamine surface modification polymer.

TABLE 4

| Ingredient | Neutral Cleaner + Ultrazine NA (wt-%) | Neutral Cleaner + P1 (wt-%) | Neutral Cleaner + P2 (wt-%) |
|---|---|---|---|
| Sodium Citrate Dihydrate | 0.5-2 | 0.5-2 | 0.5-2 |
| C8-C10 Alkyl Polyglucoside | 0.1-0.5 | 0.1-0.5 | 0.1-0.5 |
| Cocamidopropyl Betaine (30%) | 0.01-0.15 | 0.01-0.15 | 0.01-0.15 |
| C10-C16 Alkyl Polyglucoside (50%) | 0.1-0.25 | 0.1-0.25 | 0.1-0.25 |
| Citric Acid (50%) | 0.005-0.02 | 0.005-0.02 | 0.005-0.02 |
| Additional Ingredients | 0.001-0.02 | 0.001-0.02 | 0.001-0.02 |
| Surface Modification Polymer | 0.5 | 0.5 | 0.5 |
| Water | q. s. | q. s. | q. s. |
| Sum | 100 | 100 | 100 |

Figure 3:
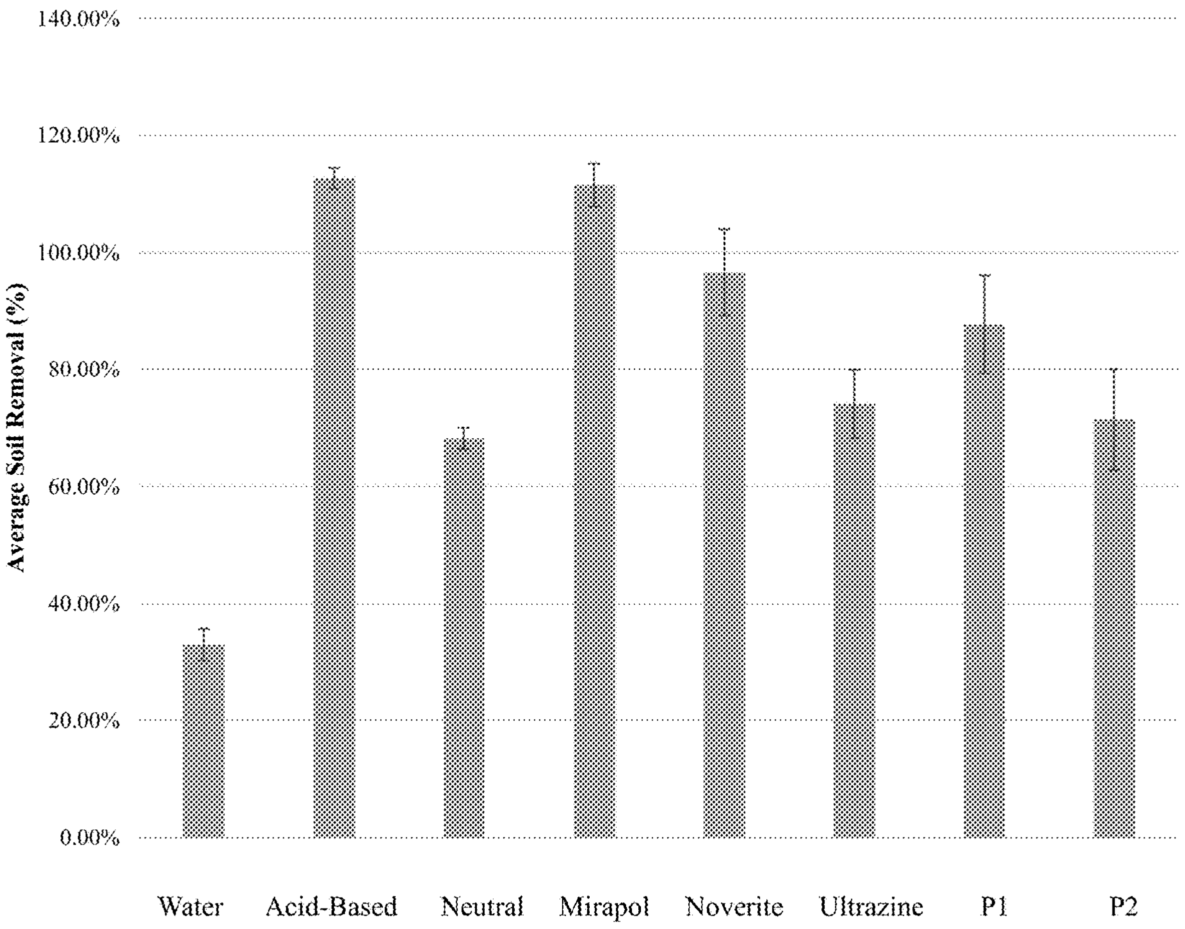
FIG. 3 is a graph of average percent soap scum removal for each formulation tested in Example 2.

FIG. 3 depicts the average percent soap scum removal for each tested formulation. After 15 cycles, the formulations containing Mirapol Surf-S 110 and Noverite 301 had significantly greater soap scum removal than the neutral cleaner without the surface modification polymer, and performed just as well as the acid-based control formulation, confirming the results in Example 1. Of the remaining polymers, only P1, the polyamidoamine surface modification polymer, contributed a significant quantitative increase in soap scum removal. P1 comprises secondary amines that are not quaternized so that the polymer is less cationic near neutral pH than quaternized amines. A polymer with less cationic charge causes the polymer to adhere to the surface, but not build up.

Figure 4:
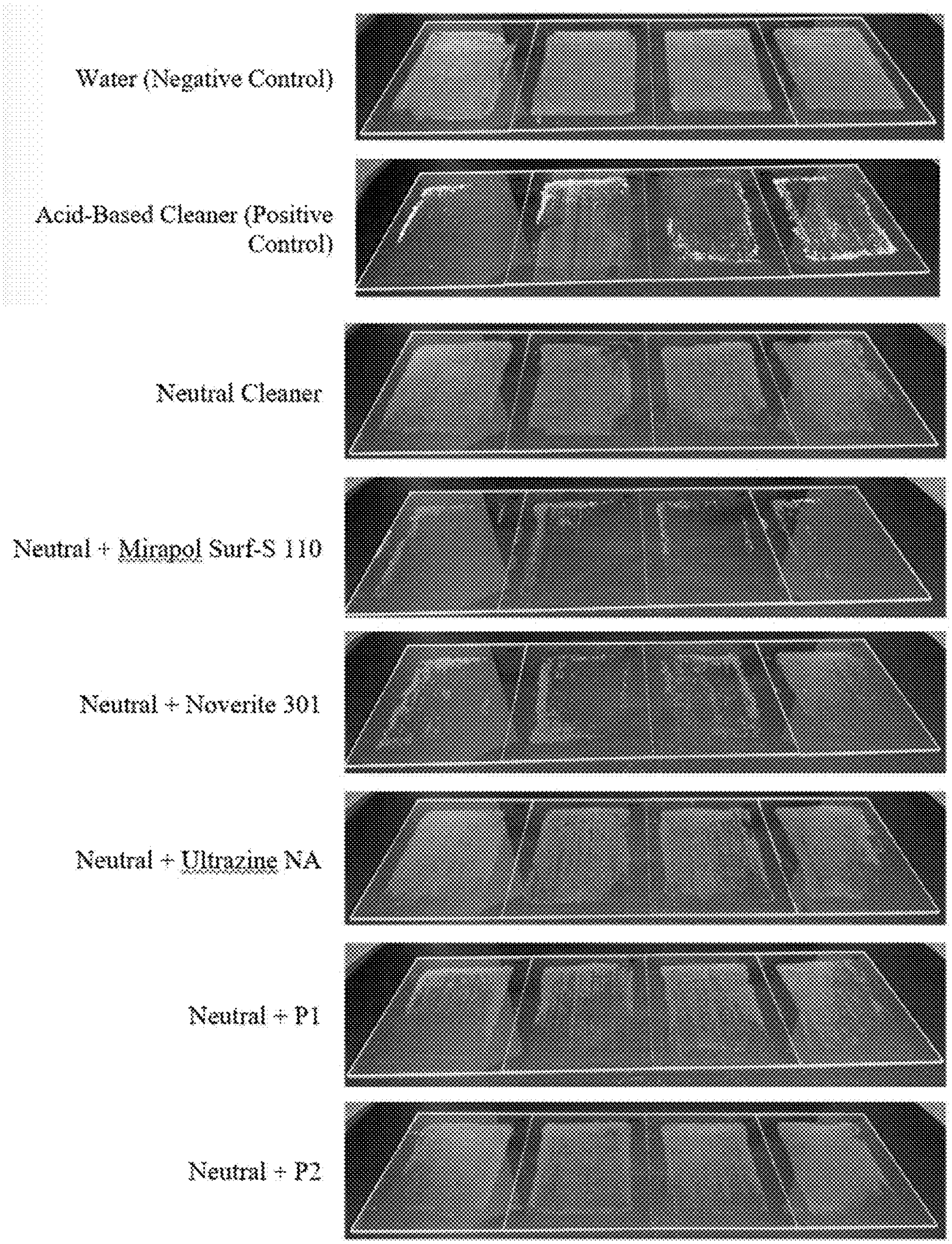
FIG. 4 shows images of slides after cleaning with the formulations tested in Example 2.

FIG. 4 shows photographs of the slides after cleaning. Visually, the cleaning formulations with either Mirapol Surf-S 110 or Noverite 301 once again resulted in increased soil removal. Of the remaining polymers, only the formulation with P1 has visible increased soil removal.

Example 3

Slides were prepared and formulations were tested according to the method outlined in Example 1. The formulations tested include a negative control formulation of water only, a positive control formulation which is a conventional acid-based formulation, a neutral cleaner, and the neutral cleaner containing Mirapol Surf-S 110. These are the same formulations as in the previous examples according to Table 3. Additionally, three formulations according to Table 5 were tested, each formulation is the neutral cleaner with a different surface modification polymer. P3 is a polyethylenimine surface modification polymer, P4 is a pDADMAC surface modification polymer, and P5 is a pDADMAC/AA surface modification polymer with about 60-65 mol % DADMAC and 35-40 mol % AA. The weight percentages for each surface modification polymer were adjusted so that each formulation had the same amount of surface modification polymer actives.

TABLE 5

| Ingredient | Neutral Cleaner + P3 (wt-%) | Neutral Cleaner + P4 (wt-%) | Neutral Cleaner + P5 (wt-%) |
|---|---|---|---|
| Sodium Citrate Dihydrate | 0.5-2 | 0.5-2 | 0.5-2 |
| C8-C10 Alkyl Polyglucoside | 0.1-0.5 | 0.1-0.5 | 0.1-0.5 |
| Cocamidopropyl Betaine (30%) | 0.01-0.15 | 0.01-0.15 | 0.01-0.15 |
| C10-C16 Alkyl Polyglucoside (50%) | 0.1-0.25 | 0.1-0.25 | 0.1-0.25 |
| Citric Acid (50%) | 0.005-0.02 | 0.005-0.02 | 0.005-0.02 |
| Additional Ingredients | 0.001-0.02 | 0.001-0.02 | 0.001-0.02 |
| Surface Modification Polymer | 1.05 | 3.41 | 1.20 |
| Water | q. s. | q. s. | q. s. |
| Sum | 100 | 100 | 100 |

Figure 5:
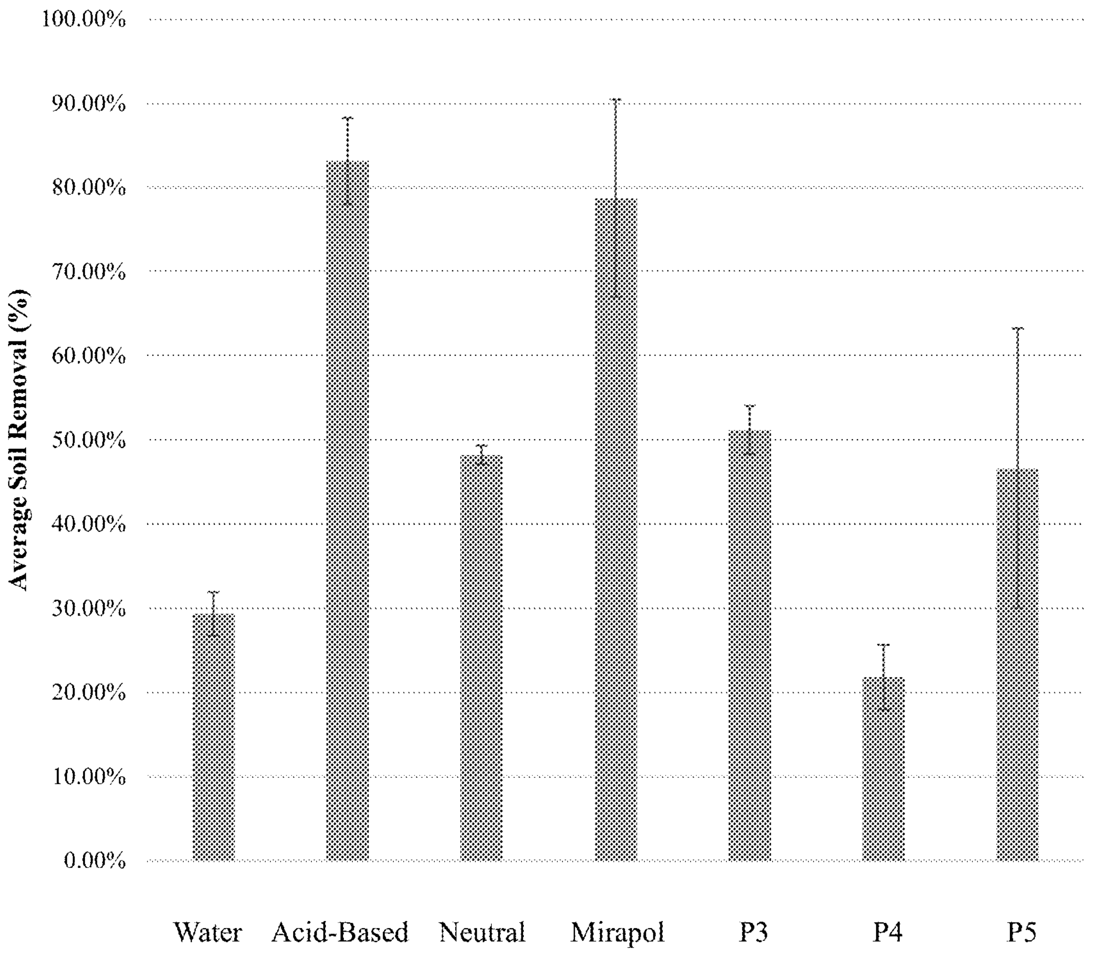
FIG. 5 is a graph of average percent soap scum removal for each formulation tested in Example 3.

FIG. 5 depicts the average percent soap scum removal for each tested formulation. After 15 cycles, the formulation containing Mirapol Surf-S 110 significantly greater soap scum removal than the neutral cleaner without the surface modification polymer, and performed just as well as the acid-based control formulation, confirming the results in previous examples. Of the remaining polymers, P3 and P5 performed similarly to the neutral cleaner, while P4 inhibited soap scum removal.

Figure 6:
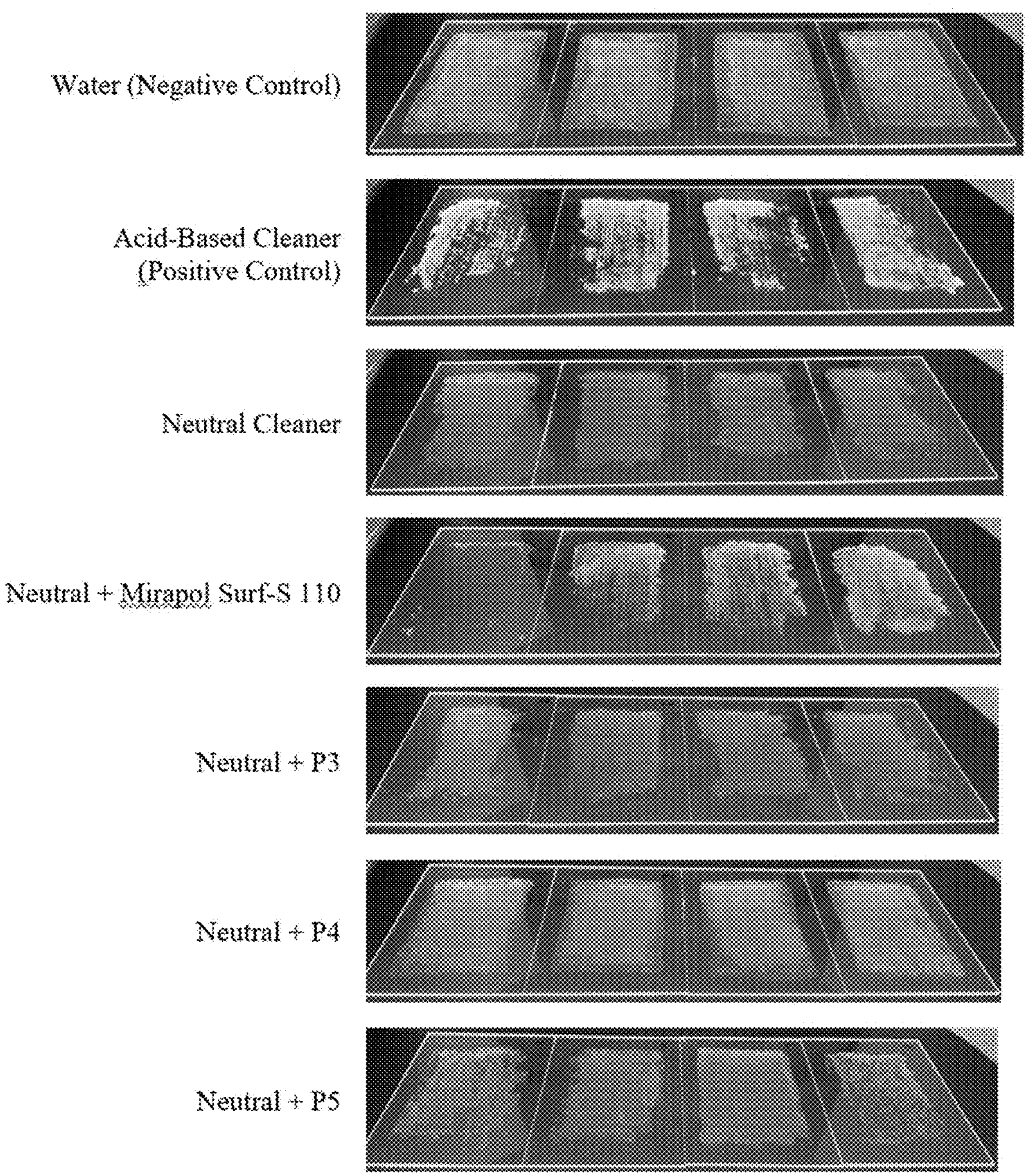
FIG. 6 shows images of slides after cleaning with the formulations tested in Example 3.

FIG. 6 shows photographs of the slides after cleaning. Visually, the cleaning formulations with Mirapol Surf-S 110 once again resulted in increased soil removal. Additionally, polymer P5 had additional visual cleaning relative to the cleaner alone and aids in soap scum removal. P5 has more DADMAC than acrylic copolymer, and P4 is pDADMAC without the acrylic acid copolymer. This data indicates that a cationic surface modification polymer will aid in soil removal for a neutral cleaner as it allows the cleaning composition to adhere to the surface to be cleaned. However, a polymer which is too cationic may adhere too well and build up on the surface and not enhance soil removal.

Example 4

Slides were prepared and formulations were tested according to the method outlined in Example 1. The formulations tested include a negative control formulation of water only, a positive control formulation which is a commercially available conventional acid-based formulation, a neutral cleaner, and the neutral cleaner with each of the following surface modification polymers: Mirapol Surf-S 110, P1, and P5 according to Table 6. Formulations with P1 and P5 are tested at varying concentrations.

TABLE 6

| Ingredient | Neutral Cleaner + Mirapol (wt-%) | Neutral Cleaner + 0.5% P1 (wt-%) | Neutral Cleaner + 1% P1 (wt-%) | Neutral Cleaner + 2% P1 (wt-%) | Neutral Cleaner + 1.2% P5 (wt-%) | Neutral Cleaner + 2.4% P5 (wt-%) |
|---|---|---|---|---|---|---|
| Sodium Citrate Dihydrate | 0.5-2 | 0.5-2 | 0.5-2 | 0.5-2 | 0.5-2 | 0.5-2 |
| C8-C10 Alkyl Polyglucoside | 0.1-0.5 | 0.1-0.5 | 0.1-0.5 | 0.1-0.5 | 0.1-0.5 | 0.1-0.5 |
| Cocamidopropyl Betaine (30%) | 0.01-0.15 | 0.01-0.15 | 0.01-0.15 | 0.01-0.15 | 0.01-0.15 | 0.01-0.15 |
| C10-C16 Alkyl Polyglucoside (50%) | 0.1-0.25 | 0.1-0.25 | 0.1-0.25 | 0.1-0.25 | 0.1-0.25 | 0.1-0.25 |
| Citric Acid (50%) | 0.005-0.02 | 0.005-0.02 | 0.005-0.02 | 0.005-0.02 | 0.005-0.02 | 0.005-0.02 |
| Additional Ingredients | 0.001-0.02 | 0.001-0.02 | 0.001-0.02 | 0.001-0.02 | 0.001-0.02 | 0.001-0.02 |
| Surface Modification Polymer | 2 | 0.5 | 1 | 2 | 1.2 | 2.4 |
| Water | q. s. | q. s. | q. s. | q. s. | q. s. | q. s. |
| Sum | 100 | 100 | 100 | 100 | 100 | 100 |

Figure 7:
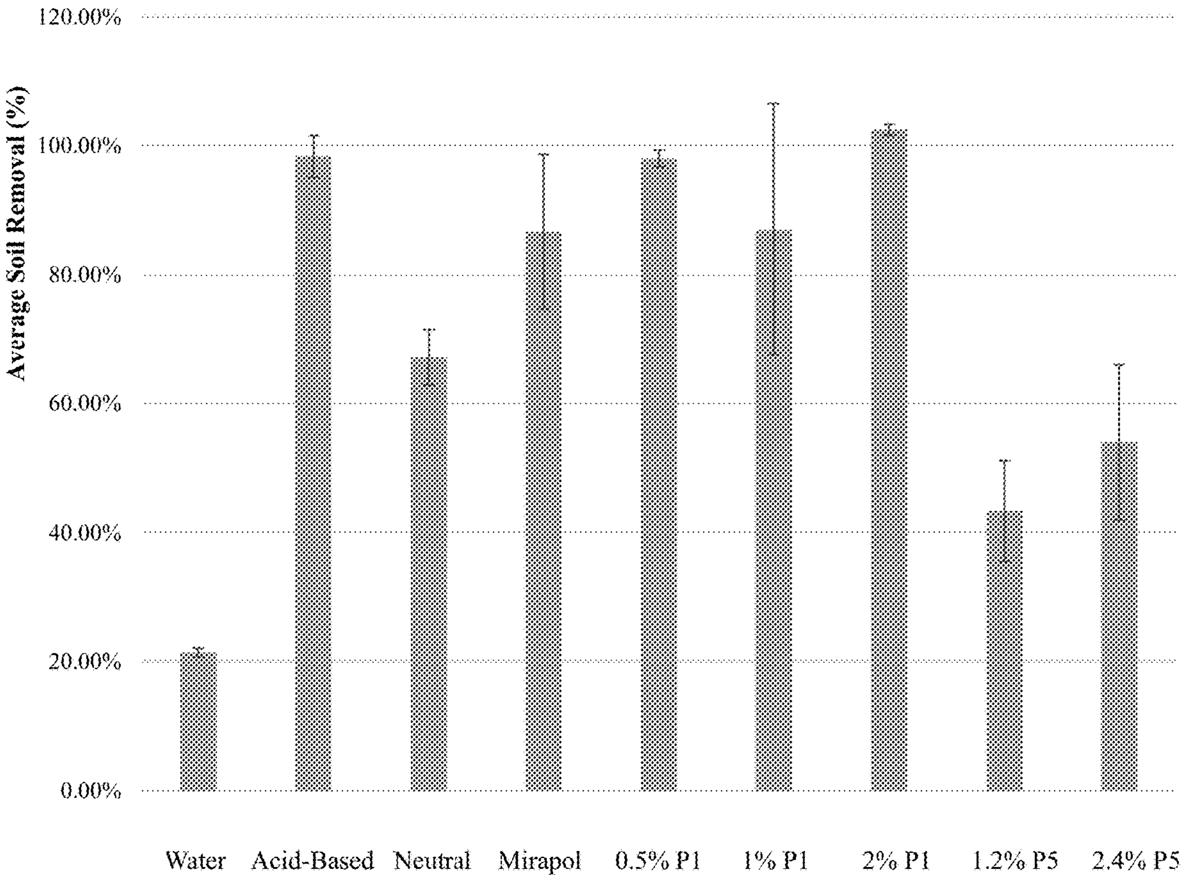
FIG. 7 is a graph of average percent soap scum removal for each formulation tested in Example 4.

FIG. 7 depicts the average percent soap scum removal for each tested formulation. After 15 cycles, the formulation containing Mirapol Surf-S 110 and P1 had significantly greater soap scum removal than the neutral cleaner without a surface modification polymer and performed just as well as the acid-based control formulation. P5 resulted in lower soil removal relative to the neutral formulation.

Figure 8:
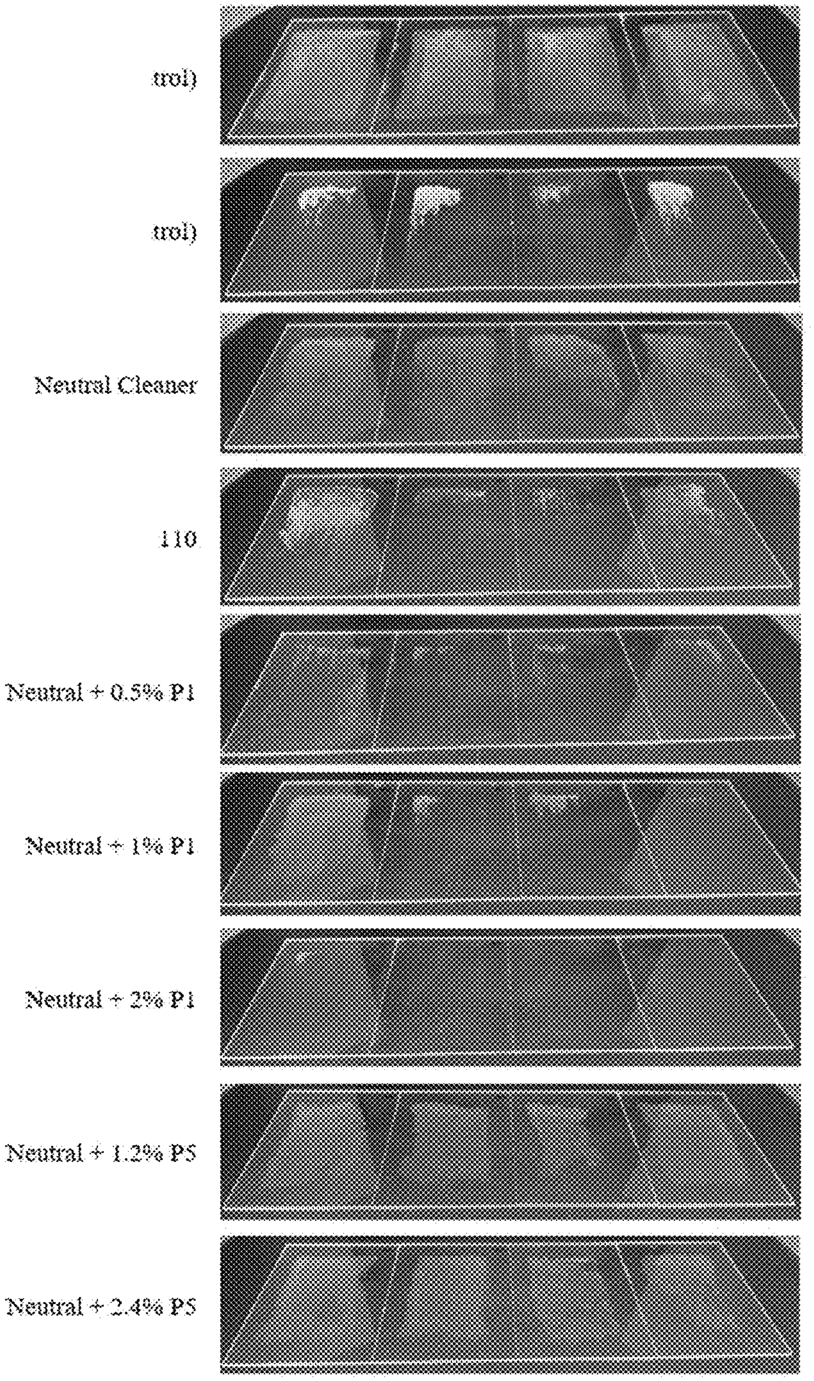
FIG. 8 shows images of slides after cleaning with the formulations tested in Example 4.

FIG. 8 shows photographs of the slides after cleaning. The visual results reflect the quantitative results. Formulations with Mirapol Surf-S 110 and P1 resulted in increased soil removal, and formulations with P5 did not.

The present disclosure is further defined by the following numbered embodiments.

1. A cleaning composition comprising: a buffer, an alkalinity source, and/or a chelant; a surfactant; an acid; a surface modification polymer; additional functional ingredients; and water.
2. The composition of embodiment 1, wherein the cleaning composition comprises from about 1 wt-% to about 80 wt-% of the buffer or alkalinity source or chelant; up to about 30 wt-% of the surfactant; up to about 30 wt-% of the acid; from about 0.1 wt-% to about 40 wt-% of the surface modification polymer; up to about 75 wt-% of the additional functional ingredients; and about 20 wt-% to about 90 wt-% of the water.
3. The composition of any one of embodiments 1-2, wherein the surface modification polymer is a cationic, hydrophilic surface modification polymer.
4. The composition of any one of embodiments 1-3, wherein the surface modification polymer comprises a polyampholyte.
5. The composition of embodiment 4, wherein the surface modification polymer comprises DADMAC and acrylic acid monomers, wherein the molar ratio of DADMAC to acrylic acid is from about 70 to 30 to about 5 to 95.
6. The composition of any one of embodiments 1-3, wherein the surface modification polymer comprises a polyamidoamine.
7. The composition of embodiment 5, wherein the surface modification polymer comprises a high molecular weight polyamidoamine with a molecular weight of from about 500 to about 1,000,000 Da, preferably from about 500 to 100,000 Da.
8. The composition of any one of embodiments 1-3, wherein the surface modification polymer comprises a cationically modified guar gum.
9. The composition of any one of embodiments 1-8, wherein the cleaning composition comprises a buffer.
10. The composition of embodiment 9, wherein the buffer comprises sodium citrate dihydrate.
11. The composition of any one of embodiments 1-10, wherein the surfactant comprises a non-ionic surfactant.
12. The composition of embodiment 11, wherein the non-ionic surfactant comprises an alkyl polyglucoside.
13. The composition of embodiment 12, wherein the alkyl polyglucoside comprises a C8-C10 alkyl polyglucoside and/or a C10-C16 alkyl polyglucoside.
14. The composition of any one of embodiments 1-13, wherein the surfactant comprises a betaine surfactant.
15. The composition of embodiment 14, wherein the betaine surfactant comprises a cocamidopropyl betaine.
16. The composition of any one of embodiments 1-15, wherein the acid is an organic acid.

17. The composition of embodiment 16, wherein the acid comprises citric acid.
18. The composition of any one of embodiments 1-17, wherein the additional functional ingredients comprise defoaming agents, anti-redeposition agents, bleaching agents, solubility modifiers, tracers, dispersants, metal protecting agents, soil anti-redeposition agents, stabilizing agents, corrosion inhibitors, enzymes, fragrances, dyes, rheology and/or solubility modifiers or thickeners, hydrotropes or couplers, solvents, and/or preservatives.
19. A method of cleaning a hard surface comprising: contacting a hard surface with the cleaning composition of any one of embodiments 1-18.
20. The method of embodiment 19, wherein the method comprises first diluting the cleaning composition form a ready-to-use cleaning composition.
21. The method of embodiment 20, wherein the ready-to-use cleaning compositions comprises from about 0.001 wt-% to about 10 wt-% of the buffer, alkalinity source, and/or chelant; up to about 10 wt-% of the surfactant; up to about 10 wt-% of the acid; from about 0.001 to about 20 wt-% of the surface modification polymer; up to about 25 wt-% of the additional functional ingredients; and from about 70 wt-% to about 99.99 wt-% of the water.
22. The method of any one of embodiments 19-21, wherein the method further comprises rinsing the surface after contacting the surface with the cleaning composition.
23. The method of any one of embodiments 19-22, wherein the method comprises using mechanical force during the contacting step.
24. The method of any one of embodiments 19-23, wherein the method removes soils by at least about 50%, at least about 65%, at least about 70%, and preferably at least about 90% or at least about 95%.
25. The method of any one of embodiments 19-24, wherein the method removes hard water deposits by at least about 50%, at least about 65%, at least about 70%, and preferably at least about 90% or at least about 95%.
26. The method of any one of embodiments 19-25, wherein the surface is contacted with the bathroom cleaning composition for at least about 10 seconds, at least about 30 seconds, at least about 1 minute, about 10 minutes, or between about 10 seconds and 10 minutes.
27. The method of any one of embodiments 19-26, wherein the hard surface is a bathroom surface.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. Any reference to accompanying drawings which form a part hereof, are shown, by way of illustration only. It is understood that other embodiments may be utilized and structural changes may be made without departing from the scope of the present disclosure. All publications discussed and/or referenced herein are incorporated herein in their entirety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A cleaning composition comprising:
about 1 wt-% to about 80 wt-% of a buffer, an alkalinity source, and/or a chelant;
up to about 30 wt-% of a surfactant;
up to about 30 wt-% of an organic acid;
from about 0.1 wt-% to about 40 wt-% of a cationic, hydrophilic surface modification polymer comprising a polyampholyte;
up to about 75 wt-% additional functional ingredients; and
about 20 wt-% to about 90 wt-% water,
wherein the cleaning composition does not include glycerine.

2. The composition of claim 1, wherein the cationic, hydrophilic surface modification polymer comprises diallyldimethylammonium chloride and acrylic acid monomers, wherein the molar ratio of diallyldimethylammonium chloride to acrylic acid is from about 70 to 30 to about 5 to 95.

3. The composition of claim 1, wherein the cationic, hydrophilic surface modification polymer further comprises a polyamidoamine.

4. The composition of claim 3, wherein the cationic, hydrophilic surface modification polymer comprises a high molecular weight polyamidoamine with a molecular weight of from about 500 to about 1,000,000 Da.

5. The composition of claim 1, wherein the cationic, hydrophilic surface modification polymer further comprises a cationically modified guar gum.

6. The composition of claim 1, wherein the cleaning composition comprises a buffer comprising sodium citrate dihydrate.

7. The composition of claim 1, wherein the surfactant comprises a non-ionic surfactant.

8. The composition of claim 7, wherein the non-ionic surfactant comprises a C8-C10 alkyl polyglucoside and/or a C10-C16 alkyl polyglucoside.

9. The composition of claim 1, wherein the surfactant comprises a betaine surfactant.

10. The composition of claim 9, wherein the betaine surfactant comprises a cocamidopropyl betaine.

11. The composition of claim 1, wherein the acid comprises citric acid.

12. The composition of claim 1, wherein the additional functional ingredients comprise defoaming agents, anti-redeposition agents, bleaching agents, solubility modifiers, tracers, dispersants, metal protecting agents, soil anti-redeposition agents, stabilizing agents, corrosion inhibitors, enzymes, fragrances, dyes, rheology modifiers, solubility modifiers or thickeners, hydrotropes or couplers, solvents, preservatives, or combinations thereof.

13. A method of cleaning a hard surface comprising: contacting a hard surface with the cleaning composition of claim 1.

14. The method of claim 13, wherein the method comprises first diluting the cleaning composition form a ready-to-use cleaning composition, wherein the ready-to-use cleaning compositions comprises from about 0.001 wt-% to about 10 wt-% of the buffer, alkalinity source, and/or chelant; up to about 10 wt-% of the surfactant; up to about 10 wt-% of the organic acid; from about 0.001 to about 20 wt-% of the cationic, hydrophilic surface modification polymer; up to about 25 wt-% of the additional functional ingredients; and from about 70 wt-% to about 99.99 wt-% of the water.

15. The method of claim 13, wherein the method further comprises rinsing the surface after contacting the surface with the cleaning composition.

16. The method of claim 13, wherein the method comprises using mechanical force during the contacting step.

17. The method of claim 13, wherein the method removes soils by at least about 50%, at least about 65%, at least about 70%, at least about 90% or at least about 95%, and/or, wherein the method removes hard water deposits by at least about 50%, at least about 65%, at least about 70%, at least about 90% or at least about 95%.

18. The method of claim 13, wherein the surface is contacted with the cleaning composition for at least about 10 seconds, at least about 30 seconds, at least about 1 minute, about 10 minutes, or between about 10 seconds and 10 minutes.

19. The method of claim 13, wherein the hard surface is a bathroom surface.

* * * * *